N. SILVESTER.
Hand Seeder.
No. 35,330. Patented May 20, 1862.
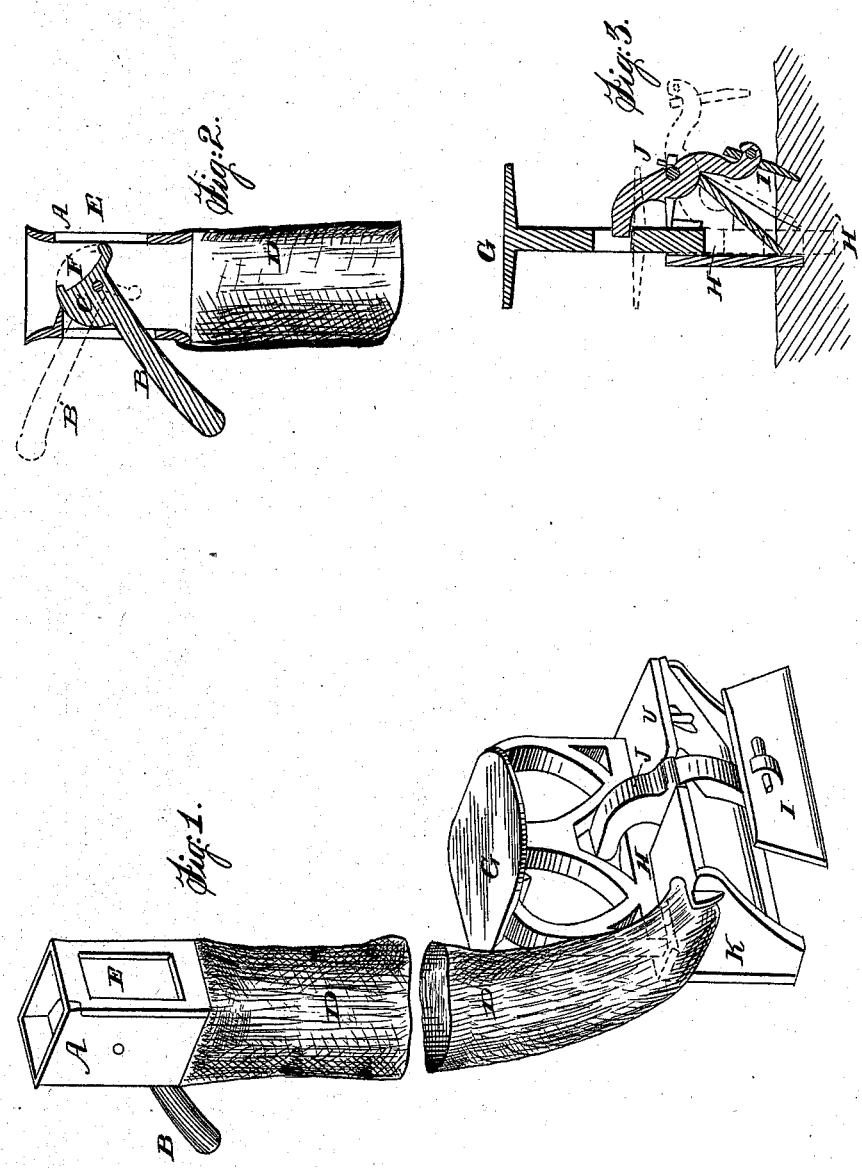

UNITED STATES PATENT OFFICE.

NELSON SILVESTER, OF GRANGER, OHIO.

IMPROVED FOOT CORN-PLANTER.

Specification forming part of Letters Patent No. 35,330, dated May 20, 1862.

*To all whom it may concern:*

Be it known that I, NELSON SILVESTER, of Granger, in the county of Medina and State of Ohio, have invented new and useful Improvements in Corn-Planters; and I do hereby declare that the following is a full and complete description of the construction and operation of the same, reference being had to the accompanying drawings, making part of this specification, in which—

Figure 1 is a perspective view. Fig. 2 is a vertical section of the upper part, and Fig. 3 is a vertical section of the planter.

Like letters refer to like parts in the several views.

A bag of corn is hung to the shoulder of the operator, the mouth of the bag being fastened to the top of the feeder A, which hangs by the side of the operator in such position that he can conveniently handle the lever B. The inner end of this lever is formed into a cam, C, which articulates upon a fulcrum-pin in the feeder-box A, as shown in Fig. 2. The cam C is so shaped that it forms a cup or cavity, F, to receive a quantity of corn sufficient for one hill when the lever B is down, as shown in Fig. 2. When the lever is raised to the position indicated at B' in Fig. 2 the cup F of the cam C is inverted, and the corn is dropped down through the tube D into the planter, Fig. 3.

E, Fig. 2, is a piece of leather or other elastic material, which is placed in or constitutes the front side of the feeder-box A, and against which the point of the cam C presses, and by its elasticity preserves the grains of corn from being broken, and moves back the surplus grain in the cavity F of the cam C, upon the principle of the brush in seeding-machines.

The platen G, Figs. 1 and 3, is strapped to the sole of the boot of the operator, and as the corn is dropped into the planter through the tube D the operator, in the act of walking, forces the lower end of the planter into the ground, and the piston H, which is attached to the platen G, forces the corn into the ground, as indicated at H', Fig. 3.

I is a shovel, which is attached to the lever J, and which is operated by the ascent and descent of the piston H, and as the piston H rises from the position seen at H' the shovel I covers up the corn by scraping the soil into the hole made by the piston H. The piston H is inclosed in a casing, K, into which casing the corn is conveyed by the tube D, at the pleasure of the operator, by the movement of the lever B.

I do not claim the herein-described feeding device A C E or the connecting-tube D, for these have been before used. Therefore

What I claim as my improvement, and desire to secure by Letters Patent, is—

The lever J and shovel I, in combination with the platen G and piston H, arranged and operating as and for the purpose set forth.

NELSON SILVESTER.

Witnesses:
  W. H. BURRIDGE,
  EDWARD SYLVESTER.